US012440757B2

(12) United States Patent
Hsu et al.

(10) Patent No.: US 12,440,757 B2
(45) Date of Patent: Oct. 14, 2025

(54) METHOD AND DEVICE FOR ENABLING CONTINUOUS LOCK-ON SHOOTING IN SHOOTING GAME

(71) Applicant: Tien Shu Hsu, Taichung (TW)

(72) Inventors: Shun Tsung Hsu, Taichung (TW); Chang Yi Wang, Taichung (TW)

(73) Assignee: Tien Shu Hsu, Taichung (TW)

( * ) Notice: Subject to any disclaimer, the term of this patent is extended or adjusted under 35 U.S.C. 154(b) by 291 days.

(21) Appl. No.: 17/925,952

(22) PCT Filed: May 18, 2020

(86) PCT No.: PCT/CN2020/090805
§ 371 (c)(1),
(2) Date: Nov. 17, 2022

(87) PCT Pub. No.: WO2021/232188
PCT Pub. Date: Nov. 25, 2021

(65) Prior Publication Data
US 2023/0182016 A1 Jun. 15, 2023

(51) Int. Cl.
*A63F 13/53* (2014.01)
*A63F 13/426* (2014.01)
*A63F 13/837* (2014.01)

(52) U.S. Cl.
CPC ............ *A63F 13/53* (2014.09); *A63F 13/426* (2014.09); *A63F 13/837* (2014.09)

(58) Field of Classification Search
CPC ....... A63F 13/53; A63F 13/426; A63F 13/837
See application file for complete search history.

(56) References Cited

U.S. PATENT DOCUMENTS 6,650,329 B1 * 11/2003 Koike ...................... G06T 15/20 463/31
9,295,912 B2 * 3/2016 Garvin .................. A63F 13/837
(Continued)

FOREIGN PATENT DOCUMENTS

CN 101282771 A 10/2008
CN 107029425 A 8/2017
(Continued)

*Primary Examiner* — James S. McClellan
(74) *Attorney, Agent, or Firm* — MUNCY, GEISSLER, OLDS & LOWE, P.C.

(57) ABSTRACT

A method and a device for enabling continuous lock-on shooting in a shooting game. Said method comprises: firstly determining whether a player uses a shooting element displayed on a display screen to perform lock-on shooting to a lockable target object on the display screen; if the player performs lock-on shooting, enabling the lockable target object to generate at least one locked position, and enabling the shooting element to select any one of the at least one locked position to perform lock-on shooting; when the locked position in which the shooting element performs lock-on shooting leaves the display screen, enabling the shooting element to select any one of the locked positions which do not leave the display screen on the lockable target object to re-perform lock-on shooting; and when unlocking or all of the at least one locked positions leave the display screen, enabling the shooting element to no longer perform lock-on shooting; and accordingly, when any one of the locked positions of the lockable target object still locates on the display screen, enabling to maintain a lock-on shooting state for the lockable target object, satisfying the playing requirements of the player.

6 Claims, 10 Drawing Sheets

(56) References Cited

U.S. PATENT DOCUMENTS

| | | | | |
|---|---|---|---|---|
| 2004/0166914 | A1* | 8/2004 | Ishihata .................. | A63F 13/45 463/2 |
| 2006/0084509 | A1* | 4/2006 | Novak .................... | A63F 13/30 463/30 |
| 2009/0181736 | A1 | 7/2009 | Haigh-Hutchinson | |

FOREIGN PATENT DOCUMENTS

| | | | |
|---|---|---|---|
| CN | 107376339 | A | 11/2017 |
| CN | 110251938 | A | 9/2019 |
| CN | 111035924 | A | 4/2020 |

* cited by examiner

METHOD AND DEVICE FOR ENABLING CONTINUOUS LOCK-ON SHOOTING IN SHOOTING GAME

FIELD OF THE INVENTION

The invention relates to a shooting game device, in particular to a method and a device for shooting game to lock shooting continuously.

BACKGROUND OF THE INVENTION

Shooting game is a popular type of games which allows a single person to play or multiple persons to play together. The single-player game machine meets the player's demand for a play to play freely without pressure. However, the multi-player game machine is more widely favored and welcomed by players due to the addition of elements of competition and concert. For example, a game device revealed in Chinese Patent Publication No.

CN101282771A is provided for a plurality of players to play together. The shooting game is provided for the players to select shooting directions and shooting targets by an operating element on a shooting game device. There is a certain probability of hitting (shooting off) a shooting target to obtain a score in each shooting. Generally, the size of the shooting target is proportional to the score, so that the player tends to shoot a large target to obtain a higher score. In order to meet the requirement of the player and reduce the difficulty in operation, the shooting game device provides a locking function which can be opened by the player to lock the shooting on the large target.

Referring to FIG. 1A, in the conventional shooting game, a locking position 2 is generated on a locked shooting target 1 to allow a player focusing on the locked shooting target 1, and a guide line 5 is shown between a shooting element 4 and the locking position 2 on a display screen 3, wherein the guide line 5 guides the player to know which shooting target 1 is currently locked by the shooting element 4.

Referring to FIG. 1B, when the locked locking position 2 is away from the display screen 3, the guide line 5 shown in FIG. 1A disappears, and since the size of the locked shooting target 1 is generally large, a portion of the locked shooting target 1 remains on the display screen 3. However, if the guide line 5 is extended beyond the display screen 3 and the shooting target 1 is continuously locked and shot, it will be unrealistic in the display. However, if the locking shooting of the shooting target 1 is cancelled, the shooting element 4 will unlock the locking shooting even if a considerable portion of the shooting target 1 still remains on the display screen 3, so that the player will feel regretful that he might have a chance to hit (shoot off) the shooting target 1.

SUMMARY OF THE INVENTION

The objection of the invention is to provide a method and a device for continuous locking shooting. While locking the lockable target object, by arranging a plurality of locking positions on a lockable target object, a locking shooting state of the lockable target object can be maintained when any locking position of the lockable target object is still on the display screen. Thus, the playing requirements of players are met.

To achieve the above object, the present invention provides a method for a shooting game to lock a shooting continuously with a game processing module to perform the following steps: player behavior determining step, locking position shooting step, a locking position replacing step, and a locking releasing step.

In the player behavior determining step, a player operates a control unit to perform a locking shooting on a lockable target object on a display screen by using a shooting element displayed on the display screen in a shooting game.

In the locking position shooting step, if the player performs the locking shooting, the game processing module generates at least one locking position on the lockable target object, and enables the shooting element to select any one of the at least one locking position to lock the shooting. In the locking position replacing step, when the locking position locked by the shooting element for locking shooting is away from the display screen, enabling the shooting element to select any locking position on the lockable target object which is not away from the display screen to relock the shooting. In the locking releasing step, when any situation occurs that the player operates the control unit to release the locking shooting performed by the shooting element or no locking position of the lockable target object exist on the display screen, unlocking the shooting of the shooting element.

The invention further provides a device for a shooting game to lock a shooting continuously. The device comprises a game processing module, a display screen, and at least one control unit. The game processing module provides a shooting game and controls a process of the shooting game and generates a game image, wherein the game image is provided with at least one lockable target object and at least one shooting element. The display screen is connected with the game processing module and displays the game image. The at least one control unit is connected with the game processing module and arranged corresponding to at least one player respectively. The at least one control unit provides the at least one player to control the at least one shooting element respectively to perform a locking shooting on any one of the at least one lockable target object, wherein the game processing module judges with respect to each player that, when the player operates the control unit to perform the locking shooting by the shooting element, the game processing module generates at least one locking position on the lockable target object and enables the shooting element to select any one of the at least one locking position to lock the shooting, and that when the locking position locked by the shooting element is away from the display screen, the shooting element is enabled to select any locking position on the lockable target object which is not away from the display screen on the lockable target object to relock the shooting, and that when any situation that the player operates the control unit to release the locking shooting performed by the shooting element or no locking position of the lockable target object exist on the display screen occurs, the shooting element unlocks the shooting.

In another embodiment, the device of the present invention further comprises at least one player end module, a server and a central screen. Each player end module is provided with a game processing module, a display screen and a control unit. Each control unit is set corresponding to a player, and the operation of the game processing module, the display screen and the control unit is referred to the foresaid embodiment. The server is connected with the at least one player end module so as to exchange data among the at least one player end module to generate a common image. The central screen is connected with the at least one player end module and is used for displaying the common image.

Accordingly, the invention is able to select any locking position which is not away from the display screen and relock the shooting by replacing the locking position, so that the locking shooting state of the lockable target object is maintained as long as the lockable target object comprises the locking position which stays on the display screen, and the requirements of players are satisfied.

DETAILED DESCRIPTION OF THE PREFERRED EMBODIMENTS

Figure 1A:
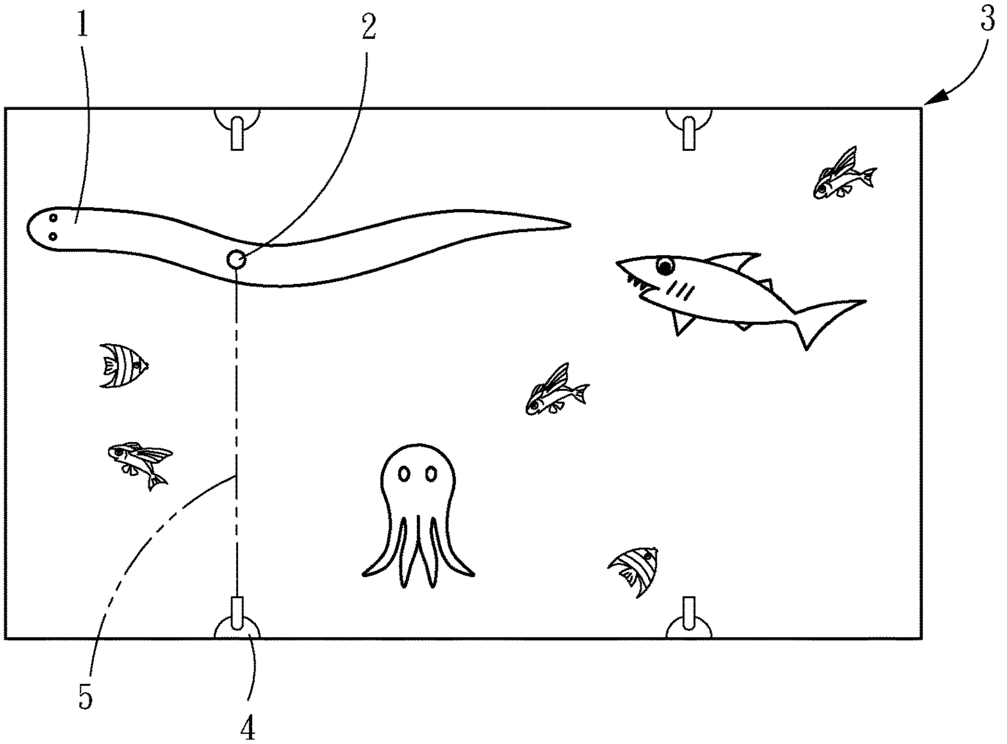
Fig. 1A PRIOR ART
FIG. 1A-1B are schematic views of a conventional game image.
Figure 1B:
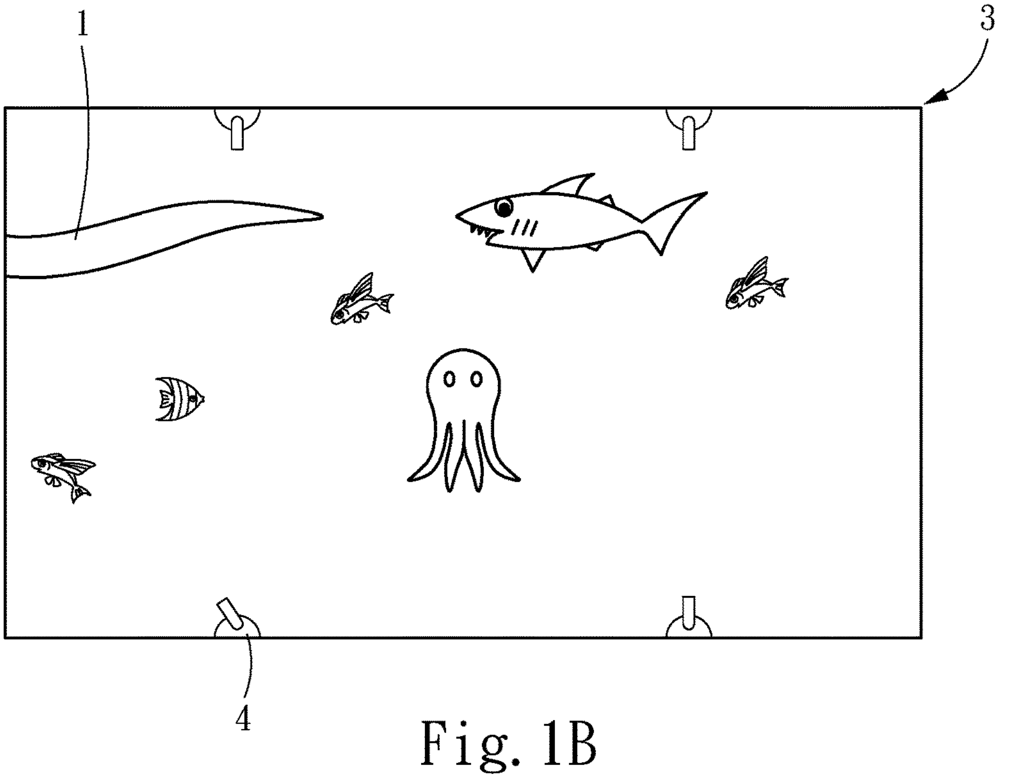
Fig. 1B PRIOR ART
Figure 2:
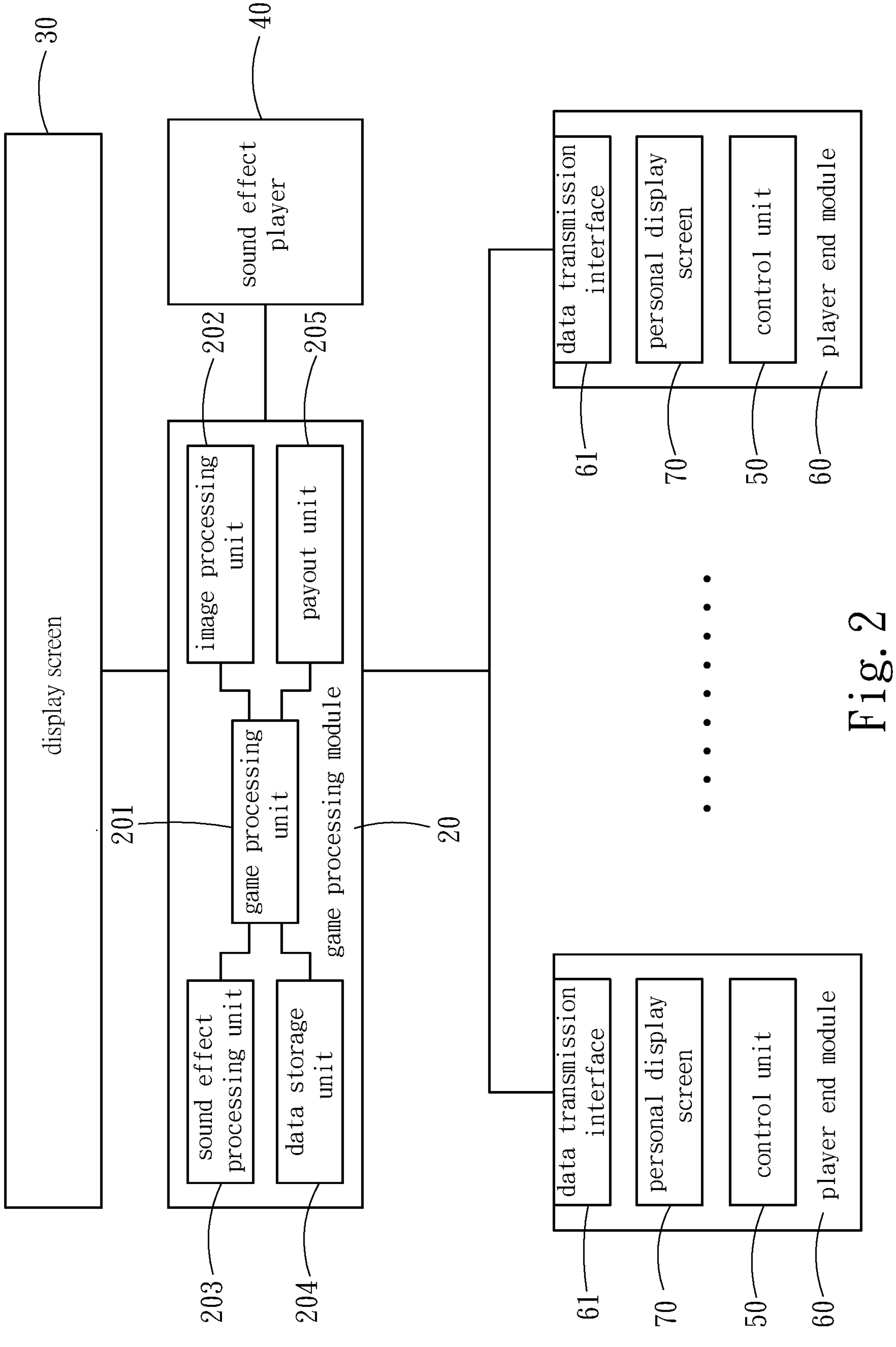
FIG. 2 is a functional block diagram of the device of the present invention.
Figure 3:
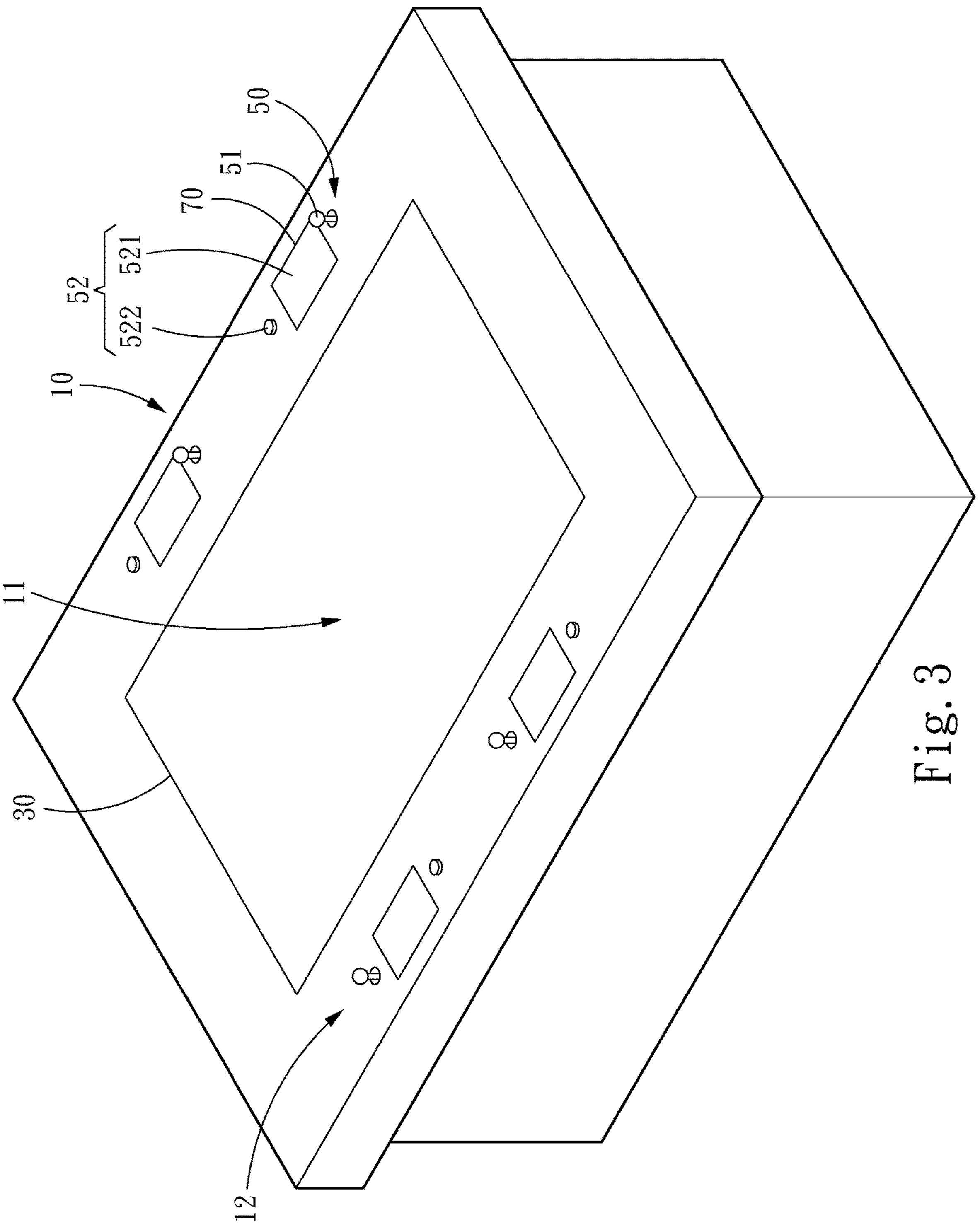
FIG. 3 is a schematic view of a game machine of the present invention.
Figure 4:
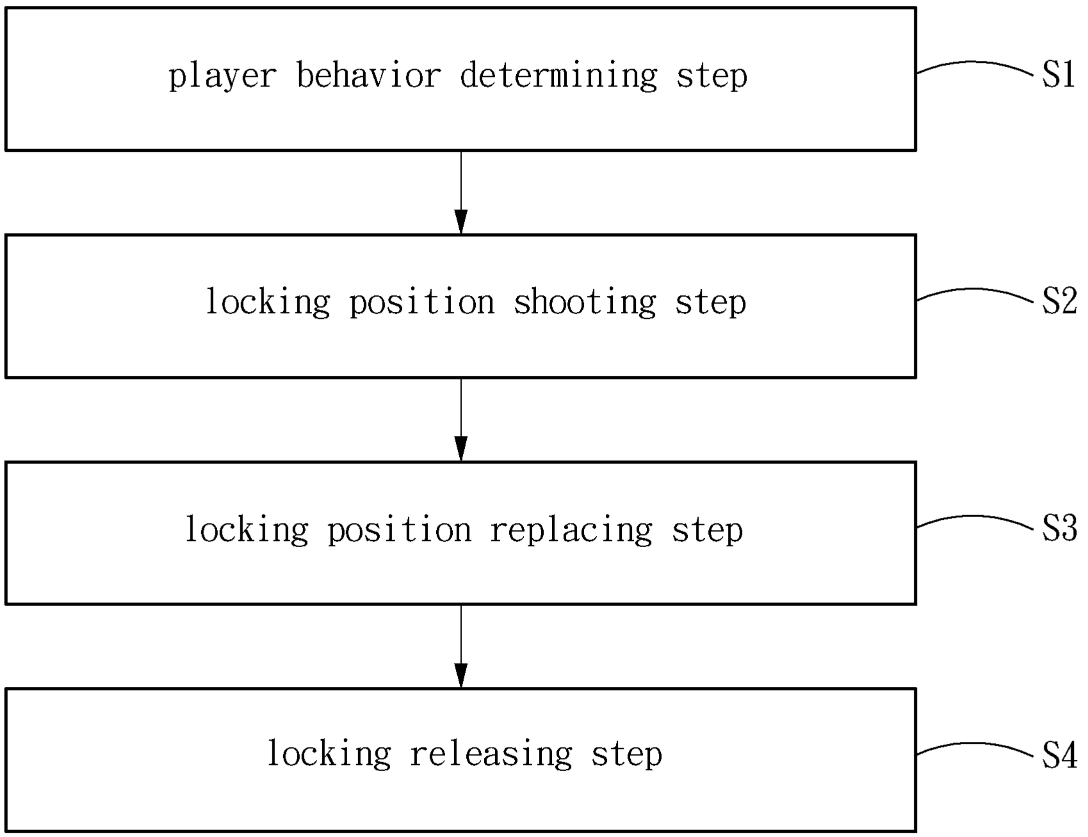
FIG. 4 is an operation flow chart of the present invention.

The detailed technical contents of the present invention will be described with reference to the drawings as follows:

Referring to FIG. 2 and FIG. 3, in one embodiment, the device of the present invention includes a table top 10, a game processing module 20, a display screen 30 and at least one control unit 50. The device may further include at least one player end module 60 and at least one personal display screen 70 provided to at least one player respectively. Each player end module 60 includes one control unit 50 and a data transmission interface 61, and the player end module 60 is coupled to the game processing module 20 via the data transmission interface 61 so that the at least one control unit 50 is coupled to the game processing module 20. The at least one personal display screen 70 is respectively arranged at the at least one player end module 60 and is respectively connected with the game processing module 20 through the data transmission interface 61. The table top 10 comprises a central area 11 and at least one shooting position 12 surrounding the central area 11, wherein the display screen 30 is arranged in the central area 11, and the control unit 50 and the personal display screen 70 of the at least one player end module 60 are respectively arranged on the at least one shooting position 12 in one-to-one manner. That is, each shooting position 12 is provided with one control unit 50 and one personal display screen 70 for one player.

Figure 5A:
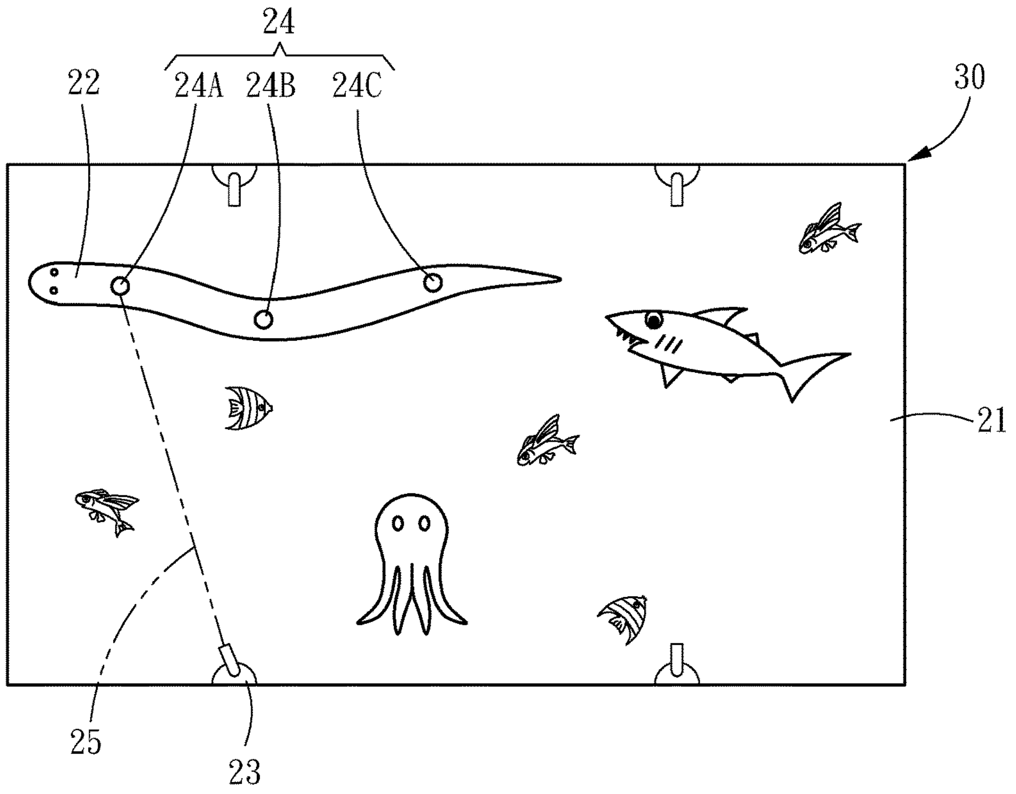
FIG. 5A-5C are schematic views of a game image of an embodiment of the present invention.

Referring to FIG. 2, FIG. 3 and FIG. 5A, the game processing module 20 provides a shooting game, controls the process of the shooting game, and generates a game image 21 including at least one lockable target object 22 and at least one shooting element 23. The game processing module 20 includes a game processing unit 201, an image processing unit 202, an sound effect processing unit 203, a data storage unit 204, and a payout unit 205, wherein the game processing module 20 generates the game image 21 by the image processing unit 202, while generates a corresponding sound effect by the sound effect processing unit 203, and plays the sound effect through a sound effect player 40. The data storage unit 204 is used for accessing game data such as scenes, game patterns, odds, scores and the like. The payout unit 205 is configured to pay the corresponding scores to the at least one player according to a game outcome and a wager score of the at least one player.

The display screen 30 is connected with the game processing module 20 and displays the game image 21. The at least one control unit 50 provides the at least one player to control the at least one shooting element 23 respectively to perform a locking shooting on any of the at least one lockable target object 22.

As shown in FIG. 3, each control unit 50 includes a direction control element 51 and an input interface 52, and the input interface 52 includes a score key 521 and an action key 522. The score key 521 changes a score of a game wager and is a touch screen for displaying various scores. The action key 522 acts as a shooting switch of the shooting element 23 and controls the shooting element 23 to fire bullets. In one embodiment, the direction control element 51 is a rocker that allows the player to swing the rocker left and right to rotate the shooting direction of the shooting element 23.

Referring to FIG. 2, FIG. 3, FIG. 4 and FIG. 5A, the method of the present invention performs the following steps through the game processing module 20: a player behavior determining step S1, a locking position shooting step S2, a locking position replacing step S3, and a locking releasing step S4.

In the player behavior determining step S1, the game processing module 20 determines the behavior of each player in the shooting game. The game processing module 20 determines whether the player operates the control unit 50 to perform the locking shooting on the lockable target object 22 displayed on the display screen 30 through the shooting element 23 displayed on the display screen 30. In detail, the game processing module 20 determines whether the shooting element 23 locks the shooting by judging whether an operation of the player on the control unit 50 has a locking feature. The locking feature comprises a variety of patterns, such as pulling down a direction control lever of the control unit 50 and simultaneously pressing a shooting button of the control unit 50, or continuously pulling down the direction control lever of the control unit 50.

In the locking position shooting step S2, the game processing module 20 generates at least one locking position 24 on the lockable target object 22 if the player performs the locking shooting. The game processing module 20 also enables the shooting element 23 to select any one of the at least one locking position 24 to lock the shooting, and indicates the lockable target object 22 which is currently locked by the shooting element 23 through a guide line 25, as shown in FIG. 5A.

In the locking position replacing step S3, when the locking position 24 locked by the shooting element 23 is away from the display screen 30, the shooting element 23 selects any locking position 24 on the lockable target object 22 which is not away from the display screen 30 to relock the shooting.

Figure 5B:
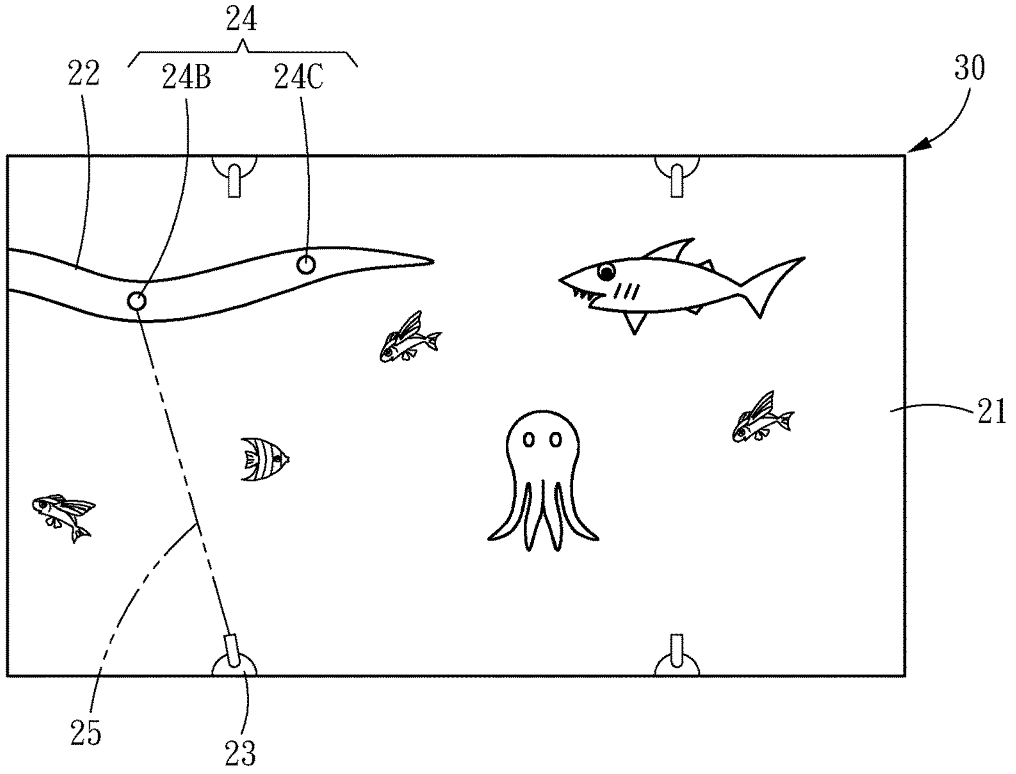
Figure 5C:
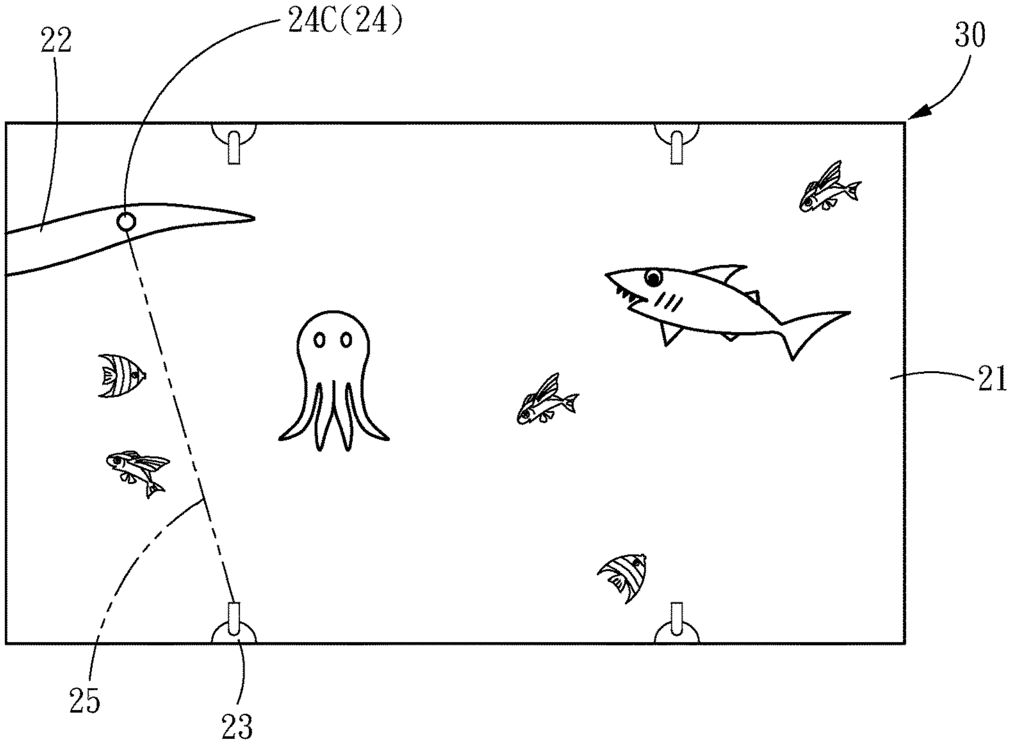

Referring to FIG. 5A, FIG. 5B, and FIG. 5C, in one embodiment, the game processing module 20 generates the at least one locking position 24 on the lockable target object 22 in an amount positively related to a maximum area size of the lockable target object 22 displayed on the display screen 30, wherein the maximum area size is the area of entire profile of the lockable target object 22. In practice, the at least one locking position 24 is preset, i.e. the at least one locking position 24 is preset on the basis of a size of the entire profile of the lockable target object 22. As shown in FIG. 5A, the lockable target object 22 (eel) is preset to comprise three locking positions 24A, 24B, and 24C. The shooting element 23 firstly locks the locking position 24A (shown in FIG. 5A), and when the locking position 24A is away from the display screen 30, the shooting element 23 relocks the locking position 24B (shown in FIG. 5B). When the locking position 24B is also away from the display screen 30, the shooting element 23 relocks the locking position 24C (shown in FIG. 5C).

Figure 6A:
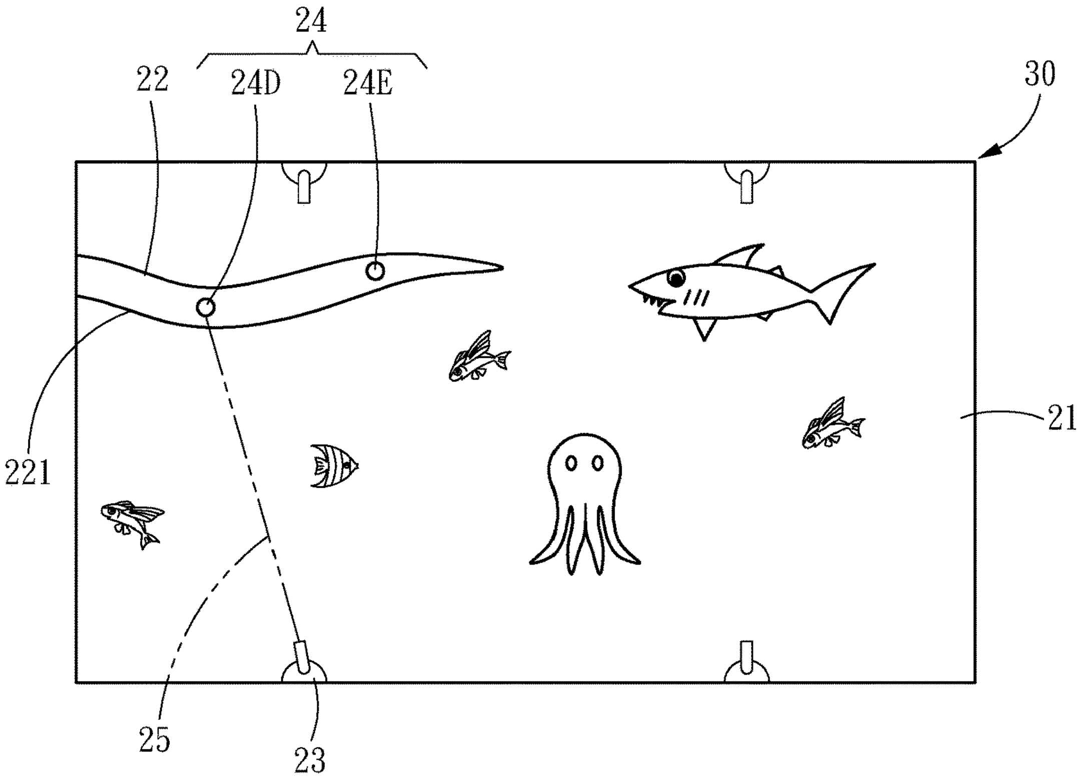
FIG. 6A-6B are schematic views of a game image of another embodiment of the present invention.
Figure 6B:
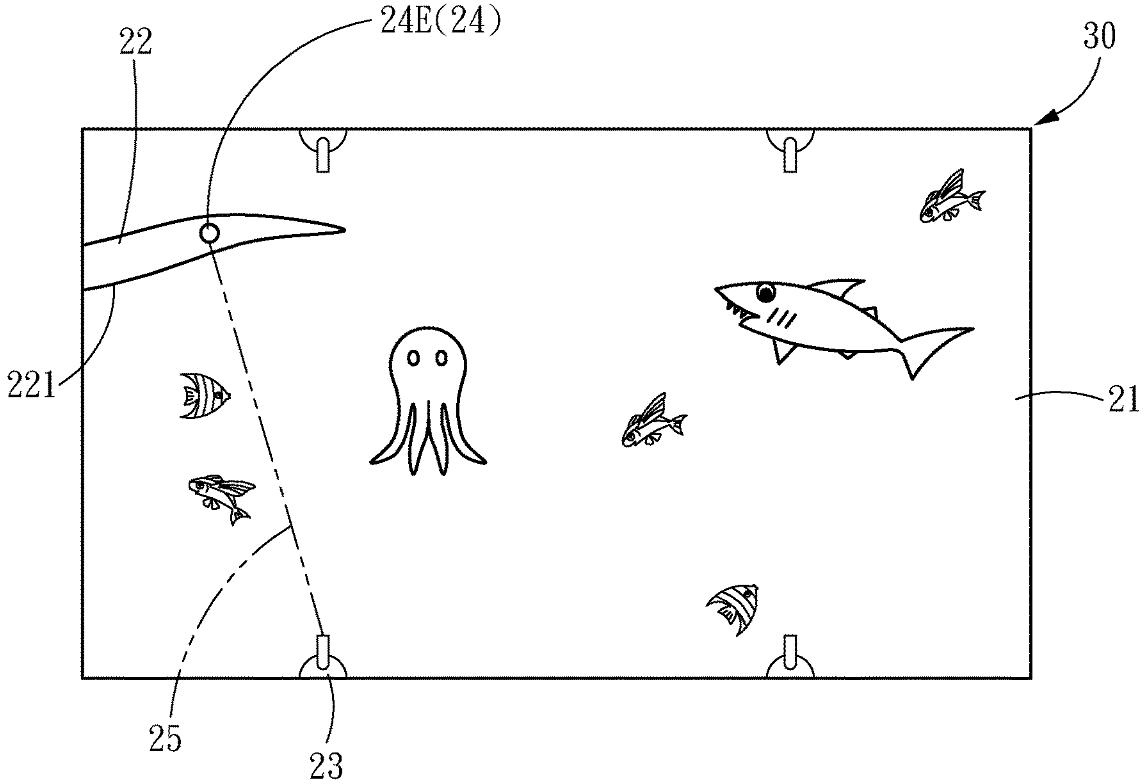

Referring to FIG. 2, FIG. 6A and FIG. 6B, in another embodiment, the game processing module 20 makes a judgment on the basis of an outline area 221 of the lockable target object 22 instantly displayed on the display screen 30, wherein when the outline area 221 is larger than a set size, the game processing module 20 generates the at least one locking position 24 on the outline area 221 in an amount positively related to the set size. The unit of the set size may be a length or an area according to actual requirements. That is, depending on the size of the instant outline area 221 of the lockable target object 22 (eel), at least one locking position 24 is generated. As shown in FIG. 6A, two locking positions 24D, 24E are generated. In practice, the game processing module 20 periodically regenerates the at least one locking position 24D, 24E at regular time intervals, wherein the period of the time interval depends on a speed of movement of the lockable target object 22. For example, the faster the speed of movement of the lockable target object 22, the shorter the period of cycle. The shooting element 23 first locks the locking position 24D (shown in FIG. 6A), and when the locking position 24D is away from the display screen 30, the shooting element 23 re-locks the locking position 24E (shown in FIG. 6B).

In the locking releasing step S4, the shooting element 23 unlocks the shooting when any following situations occurs that the player controls the control unit 50 to release the locking shooting performed by the shooting element 23, or when the locking position 24 of the lockable target object 22 does not exist on the display screen 30. That is, the player can actively release the locking shooting performed by the shooting element 23, or the shooting element 23 unlocks the shooting when all the locking positions 24 of the lockable target object 22 (eels) are away from the display screen 30.

In the locking releasing step S4, the manner in which the player operates the control unit 50 to release the locking shooting performed by the shooting element 23 differs according to the different locking features mentioned previously. For example, when the locking feature is to continuously pull down the direction control lever of the at least one control unit 50, the game processing module 20 determines whether the shooting element 23 unlocks the shooting by judging whether the operation of the player on the control unit 50 maintains the locking feature. That is, the locking shooting is released when the player no longer pulls down the direction control lever of the at least one control unit 50.

When the aforementioned locking feature is to pull down the direction control lever of the control unit 50 and simultaneously press a shooting button of the control unit 50, the game processing module 20 determines whether the shooting element 23 unlocks the shooting by judging whether the operation of the player on the control unit 50 comprises an unlocking feature. In one embodiment, the unlocking feature is the same as the locking feature, i.e. pulling down the direction control lever of the control unit 50 and simultaneously pressing the shooting button of the control unit 50. Alternatively, in other embodiment, the locking shooting is released by other operation.

Figure 7:
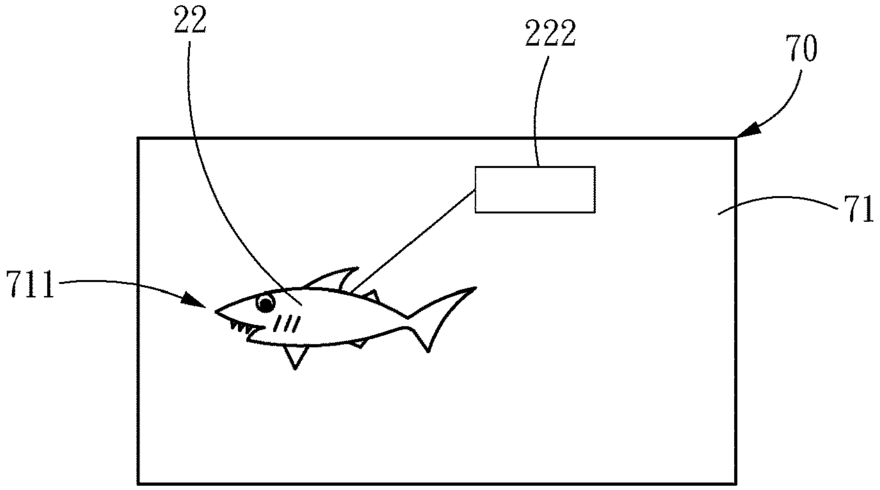
FIG. 7 is a schematic view of a personal game image of the present invention.

Referring to FIG. 2 and FIG. 7, the personal display screen 70 presents a corresponding personal game image 71 of the player. The personal game image 71 displays specific information 711 to the corresponding player. The specific information 711 including but not limited to game descriptions, game guides, instruction guides, player status, etc. For example, if the player desires a game guide for the lockable target object 22, the personal game image 71 is controlled by the control unit 50 to display information 222 of the lockable target object 22, wherein the information 222 includes the score of the lockable target object 22 or the game guide etc. Besides, in order to clearly show the information 222 of the lockable target object 22, different information 222 of the lockable target object 22 is displayed in turn.

Figure 8:
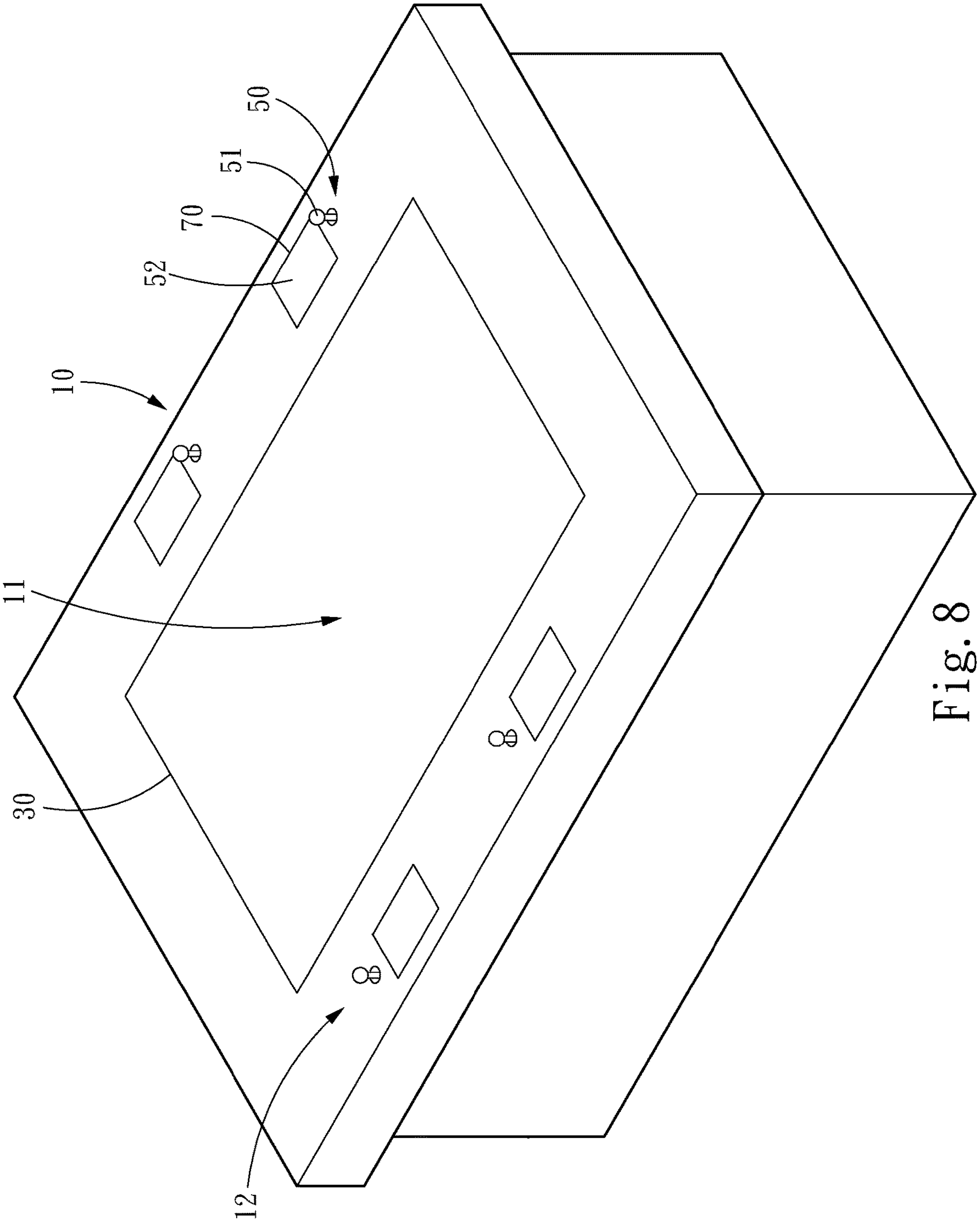
FIG. 8 is a schematic view of a game machine of another embodiment of the present invention.
Figure 9:
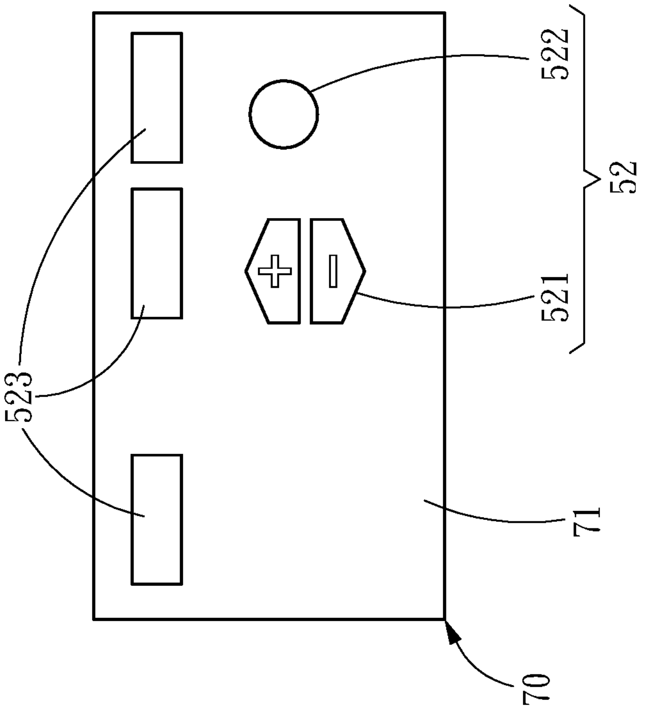
FIG. 9 is a schematic view of a personal display screen of another embodiment of the present invention.

Referring to FIG. 8 and FIG. 9, schematic views of a game machine and a personal display screen of another embodiment of the present invention are shown. In this embodiment, the personal display screen 70 is a touch screen, and the personal display screen 70 is integrated with the input interface 52. The personal display screen 70 (touch screen) provides both input and display functions, i.e., a virtual score key 521 and a virtual action key 522 are displayed on the personal game image 71 of the personal display screen 70 as the input interface 52. A plurality of functional keys 523 are also displayed on the personal game image 71 to provide functions such as language selection, game rule description, automatic transmission, function switching, etc. Thus, each player uses the touch screen as both the input interface 52 and the personal display screen 70 in conjunction with the direction control element 51 to play a game.

Figure 10:
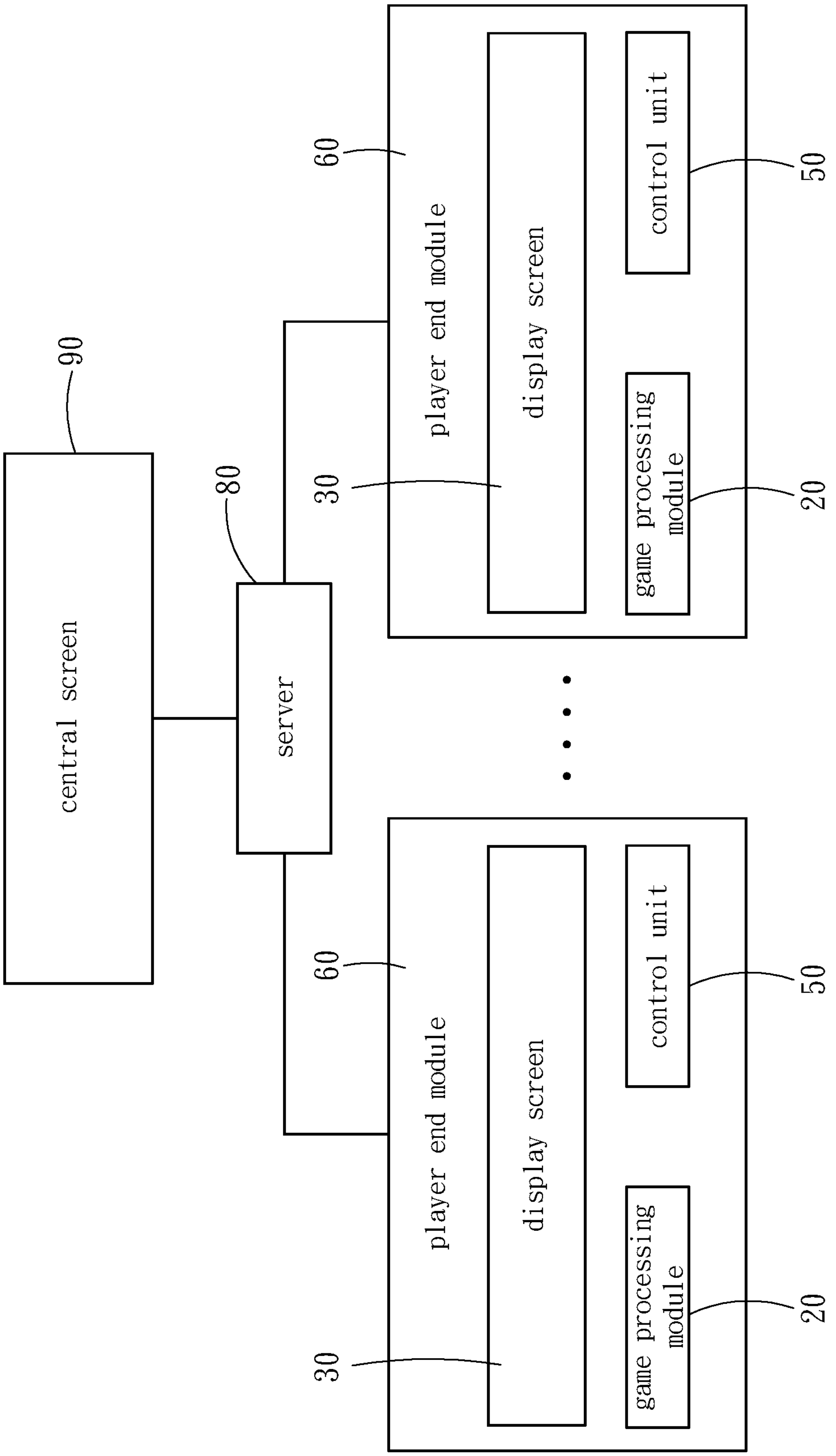
FIG. 10 is a functional block diagram of a device of another embodiment of the present invention.

Referring to FIG. 10, a system block diagram of another embodiment is shown. Comparing with the previous embodiment, a server 80 and a central screen 90 are further provided in this embodiment, and each player end module 60 comprises one game processing module 20, one display screen 30 and one control unit 50, wherein each control unit 50 is arranged corresponding to a player. The operation of the game processing module 20, the display screen 30 and the control unit 50 are the same as the previous embodiment. The server 80 is connected with every player end modules 60 for exchanging data between the at least one player end module 60 to generate a common image. The central screen 90 is connected with the at least one player end module 60 and is used for displaying the common image.

In summary, the advantages of the present invention include at least:

1. By replacing the locking position, the invention is able to select any locking position which is not away from the display screen and relock the shooting, so that the locking shooting state of the lockable target object is maintained as long as the lockable target object comprises the locking position which stays on the display screen, and the requirements of players are satisfied.
2. The invention judges the outline area of the lockable target object instantly displayed on the display screen. When the outline area is larger than the set size, at least one locking position is generated, and the distribution of the locking positions is changed periodically in real-time, so that the distribution of the locking positions is more uniform. When the locking position of the lockable target object is switched, a shifting distance of the guide line is reduced so that the visual burden of the player is reduced.

What is claimed is:

1. A method for operating a shooting game including a game processing module to perform the following:

displaying on a display screen at least two target objects traversing the display screen towards a periphery of the display screen, wherein at least one of the target objects is a lockable target object with an elongated shape and the lockable target object includes a plurality of locking positions located at different positions along the elongated shape;

displaying on the display screen at least two shooting elements, wherein each of the shooting elements are positioned around a periphery of the display screen and operated by different players;

determining whether a player operates a control unit to perform a locking shooting with one of the shooting elements on a first locking position of the lockable target object;

continuously maintaining the locking shooting when the locking target object traverses the display screen such that when the first locking position is outside the periphery of the display screen and no longer visible to the player, the game processing module replaces the first locking position that is outside the periphery of the display screen with a second locking position that remains inside the periphery of the display screen; and unlocking the locking shooting when the player operates the control unit to release the locking shooting performed by the shooting element or when no locking position of the lockable target object exist within the periphery of the display screen.

2. The method as claimed in claim 1, wherein the game processing module makes a judgment based on an outline area of the lockable target object instantly displayed on the display screen, and when the outline area is larger than a set size, the game processing module generates the plurality of locking positions on the outline area in an amount positively related to the set size.

3. The method as claimed in claim 1, wherein the game processing module generates the plurality of locking positions on the lockable target object in an amount positively related to a maximum area size based on the maximum area size of the lockable target object displayed on the display screen.

4. The method as claimed in claim 1, wherein the game processing module determines whether the shooting element locks the locking shooting by judging whether an operation of the player on the control unit has a locking feature.

5. The method as claimed in claim 4, wherein the game processing module determines whether the shooting element unlocks the locking shooting by judging whether the operation of the player on the control unit maintains the locking feature.

6. The method as claimed in claim 4, wherein the game processing module determines whether the shooting element unlocks the locking shooting by judging whether the operation of the player on the control unit comprises an unlocking feature.

* * * * *